US010699105B2

(12) United States Patent
Bostick et al.

(10) Patent No.: US 10,699,105 B2
(45) Date of Patent: Jun. 30, 2020

(54) WORKFLOW CREATION BY IMAGE ANALYSIS

(71) Applicant: International Business Machines Corporation, Armonk, NY (US)

(72) Inventors: James E. Bostick, Cedar Park, TX (US); Danny Y. Chen, Austin, TX (US); Sarbajit K. Rakshit, Kolkata (IN); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/402,372

(22) Filed: May 3, 2019

(65) Prior Publication Data

US 2019/0347477 A1 Nov. 14, 2019

Related U.S. Application Data

(63) Continuation of application No. 15/612,005, filed on Jun. 2, 2017, now abandoned.

(51) Int. Cl.
*G06K 9/00* (2006.01)
*G06K 9/62* (2006.01)

(52) U.S. Cl.
CPC ......... *G06K 9/00335* (2013.01); *G06K 9/622* (2013.01); *G06K 2209/27* (2013.01)

(58) Field of Classification Search
None
See application file for complete search history.

(56) References Cited

U.S. PATENT DOCUMENTS

| 9,501,745 | B2 | 11/2016 | Nitz | |
|---|---|---|---|---|
| 2012/0035976 | A1* | 2/2012 | Flinn | G06Q 10/06 705/7.27 |
| 2014/0074545 | A1 | 3/2014 | Minder | |
| 2014/0095203 | A1 | 4/2014 | Anand et al. | |
| 2014/0195258 | A1* | 7/2014 | Burton | G06Q 10/0633 705/2 |

(Continued)

OTHER PUBLICATIONS

Arbab-Zavar et al., "On hierarchical modelling of motion for workflow analysis from overhead view," Machine Vision and Applications, 2014, 25:345-359 (Year: 2014).*

(Continued)

*Primary Examiner* — Soo Shin
(74) *Attorney, Agent, or Firm* — Stephen R. Yoder; Gilbert Harmon, Jr.

(57) ABSTRACT

A computer implemented method for generating contextual workflows includes receiving a plurality of images, analyzing the received plurality of images to identify one or more activities corresponding to the plurality of images and one or more contextual details corresponding to the plurality of images, wherein the contextual details indicate a capture location, a capture time, a capture sequence, or a capture subject for the plurality of images, calculating a confidence weighting for the one or more identified activities for the plurality of images, creating a contextual workflow according to the calculated confidence weightings, receiving a query for a workflow corresponding to an indicated context, and identifying one or more workflows that matches the indicated context.

1 Claim, 5 Drawing Sheets

(56) References Cited

U.S. PATENT DOCUMENTS

| | | | |
|---|---|---|---|
| 2014/0207506 A1 | 7/2014 | Palmert et al. | |
| 2014/0337085 A1 | 11/2014 | Li | |
| 2015/0278726 A1* | 10/2015 | Marx | G06Q 10/0633 705/2 |
| 2016/0328604 A1* | 11/2016 | Bulzacki | G06K 9/00335 |

OTHER PUBLICATIONS

Rohrbach et al., "A Database for Fine Grained Activity Detection of Cooking Activities," In IEEE Conference on Computer Vision and Pattern Recognition (CVPR), pp. 1194-1201, 2012 (Year: 2012).*

Voulodimos et al., "Online classification of visual tasks for industrial workflow monitoring," Neural Networks, 24(2011) 852-860 (Year: 2011).*

Arbab-Zavar et al., "On hierarchical modelling of motion for workflow analysis from overhead view", Received: Sep. 3, 2012 / Revised: Jun. 1, 2013 / Accepted: Jun. 10, 2013, © Springer-Verlag Berlin Heidelberg 2013, Machine Vision and Applications, DOI 10.1007/s00138-013-0528-7, 15 pages.

"Cornell Robot Learning: Human Activity Detection", Robot Learning Lab, Personal Robotics, Co-Robots, Robotic Perception. Computer Science Department, Cornell University, © Cornell University, 2009, 2 pages.

"Personal Robotics: Semantic Scene Labeling from RGB-D data", Robot Learning Lab Personal Robotics, Co-Robots, Robotic Perception. Computer Science Department, Cornell University, © Cornell University, 2009, 3 pages.

Bostick et al., "Workflow Creation by Image Analysis", U.S. Appl. No. 15/612,005, filed Jun. 2, 2017, 31 pages.

IBM, Appendix P, list of patents or patent applications treated as related, filed herewith, 2 pages.

Rohrbach et al., "A Database for Fine Grained Activity Detection of Cooking Activities", IEEE Conf. on Computer Vision and Pattern Recognition (CVPR), Providence, Rhode Island, Jun. 2012, 8 pages.

Bostick et al., "Workflow Creation by Image Analysis", U.S. Appl. No. 15/849,816, filed Dec. 21, 2017, 31 pages.

* cited by examiner

WORKFLOW CREATION BY IMAGE ANALYSIS

BACKGROUND OF THE INVENTION

The present invention relates generally to the field of image analysis, and more specifically to analyzing images to create workflows.

A workflow consists of an orchestrated and repeatable pattern of business activity enabled by the systemic organization of resources into processes that transform materials, provide services, or process information. In a broader sense, a workflow is a sequence of activities to be performed to complete a task. Each activity has a defined duration, actor, guideline, and other such details. The activities may also have parameters that indicate locations, timeframes, and other contextual parameters that impose limitations on the occurrence of said activities. Workflows can provide instructions for task completion to an individual who is unfamiliar with either the task itself or a context in which the task must be completed.

SUMMARY

As disclosed herein, a computer implemented method for generating contextual workflows includes receiving a plurality of images, analyzing the received plurality of images to identify one or more activities corresponding to each image and one or more contextual details corresponding to each image, wherein the contextual details indicate a capture location, a capture time, a capture sequence, or a capture subject for each of the images, calculating a confidence weighting for the one or more identified activities for the plurality of images, creating a contextual workflow according to the calculated confidence weightings, receiving a query for a workflow corresponding to an indicated context, and identifying one or more workflows that matches the indicated context. A computer program product and a computer system corresponding to the method are also disclosed.

DETAILED DESCRIPTION

When engaging in unfamiliar activities, a person may not know the correct sequence to take in completing said activities, if there is one. For example, a person who has traveled to an unfamiliar location may be unaware of a customary sequence of events taken with respect to a particular activity. While in some cases prior research can provide some information, such research may not take into consideration existing contextual details, such as a time of day, time of year, nearby objects, or events. Furthermore, prior research may be infeasible with limited time, especially if one is put into a situation unexpectedly or without prior planning.

For example, if visiting Boston and trying to take the subway, a person may not know that at certain times of day at some platforms, he must stand in specific spots or else they may miss the train or must rush to try to board. The present invention analyzes images that correspond to one or more contextual details related to a device's current conditions to provide one or more workflows indicating suggested actions based on the activities displayed in the images. In the above example, the present invention analyzes images taken at the current time of day of the subway platform the person is standing at, and identifies that people who are standing in certain locations are in said locations before and after the arrival of the train. In other words, these people were unable to board, perhaps because it is a particularly busy time for this platform and they were standing too far from the doors. A workflow is therefore created indicating that the user needs to stand in a certain location to board the train (next to a pillar, away from a stairwell, etc.).

The present invention will now be described in detail with reference to the Figures. Implementation of embodiments of the invention may take a variety of forms, and exemplary implementation details are discussed subsequently with reference to the Figures.

Figure 1:
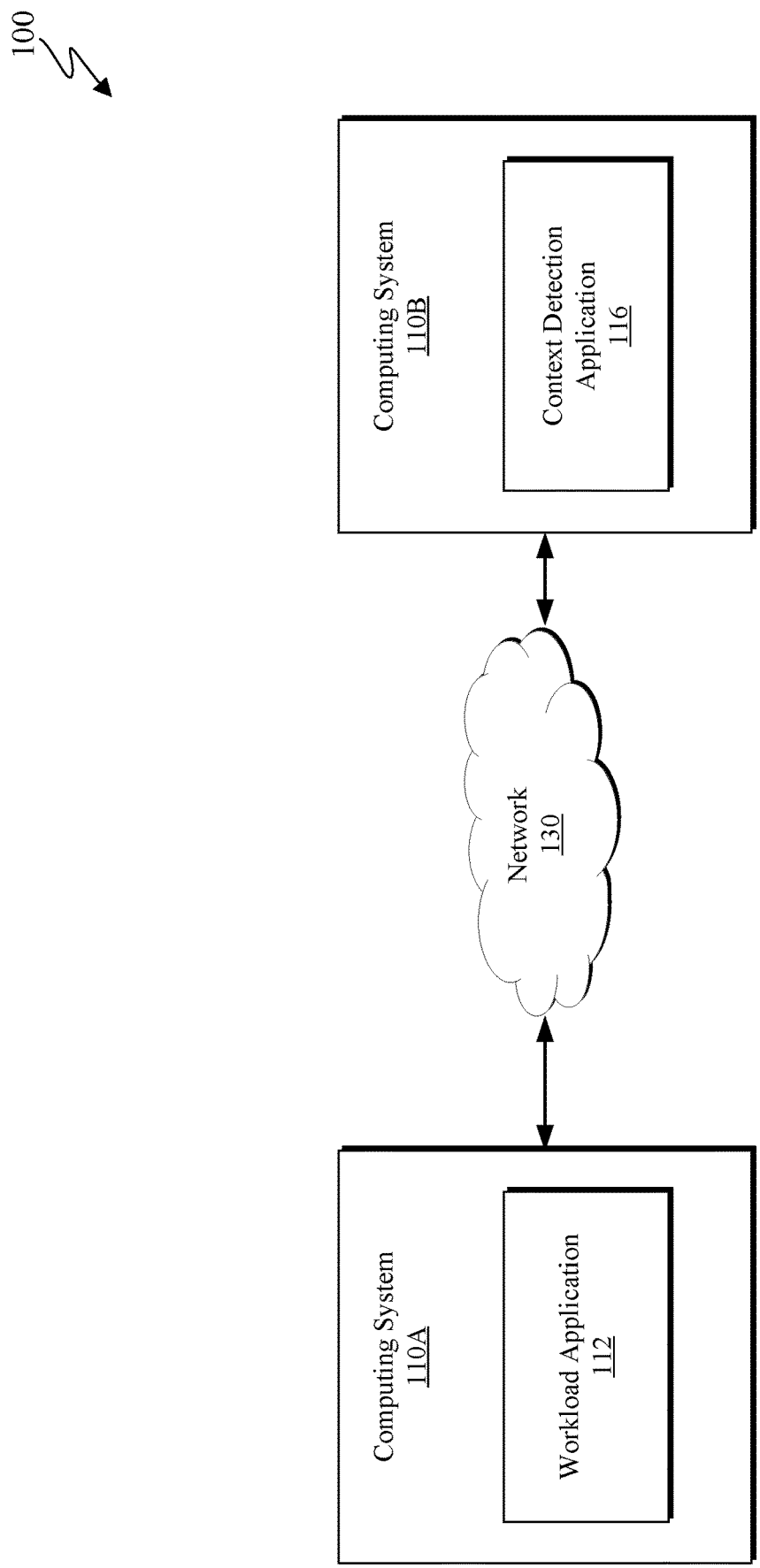
FIG. 1 is a functional block diagram depicting one example of a contextual workflow creation system in accordance with one embodiment of the present invention.

FIG. 1 is a functional block diagram depicting one example of a contextual workflow creation system 100 in accordance with one embodiment of the present invention. As depicted, contextual workflow creation system 100 includes computing systems 110 and network 130. Contextual workflow creation system 100 enables workflows to be created and identified based on a set of one or more contextual details.

Computing systems 110 can be desktop computers, laptop computers, specialized computer servers, or any other computer systems known in the art. In some embodiments, computing systems 110 represent computer systems utilizing clustered computers and components to act as a single pool of seamless resources. In general, computing systems 110 are representative of any electronic devices, or combinations of electronic devices, capable of executing machine-readable program instructions, as described in greater detail with regard to FIG. 5.

As depicted, computing system 110B includes a context detection application 116. Context detection application 116 may be configured to detect one or more current contextual conditions corresponding to computing system 110B. Example contextual conditions may include a current time, location, or weather conditions detected by computing system 110B, or a current event indicated by a calendar service or social networking platform available via computing system 110B. In some embodiments, context detection application 116 is further configured to capture, store, and provide images to computing system 110A via network 130.

As depicted, computing system 110A includes a workload creation application 112. Workload creation application 112 may be configured to receive images as well as current contextual conditions corresponding to computing system 110B. In some embodiments, workload creation application 112 is configured to execute a workload creation method. One example of a suitable workload creation method is described in further detail with respect to FIG. 2.

Network 130 can be, for example, a local area network (LAN), a wide area network (WAN) such as the Internet, or a combination of the two, and include wired, wireless, or fiber optic connections. In general, network 130 can be any combination of connections and protocols that will support communications between computing system 110A and 110B in accordance with an embodiment of the present invention. In at least one embodiment of the present invention, network 130 transmits contextual details and identified workflows between computing system 110A and 110B.

Figure 2:
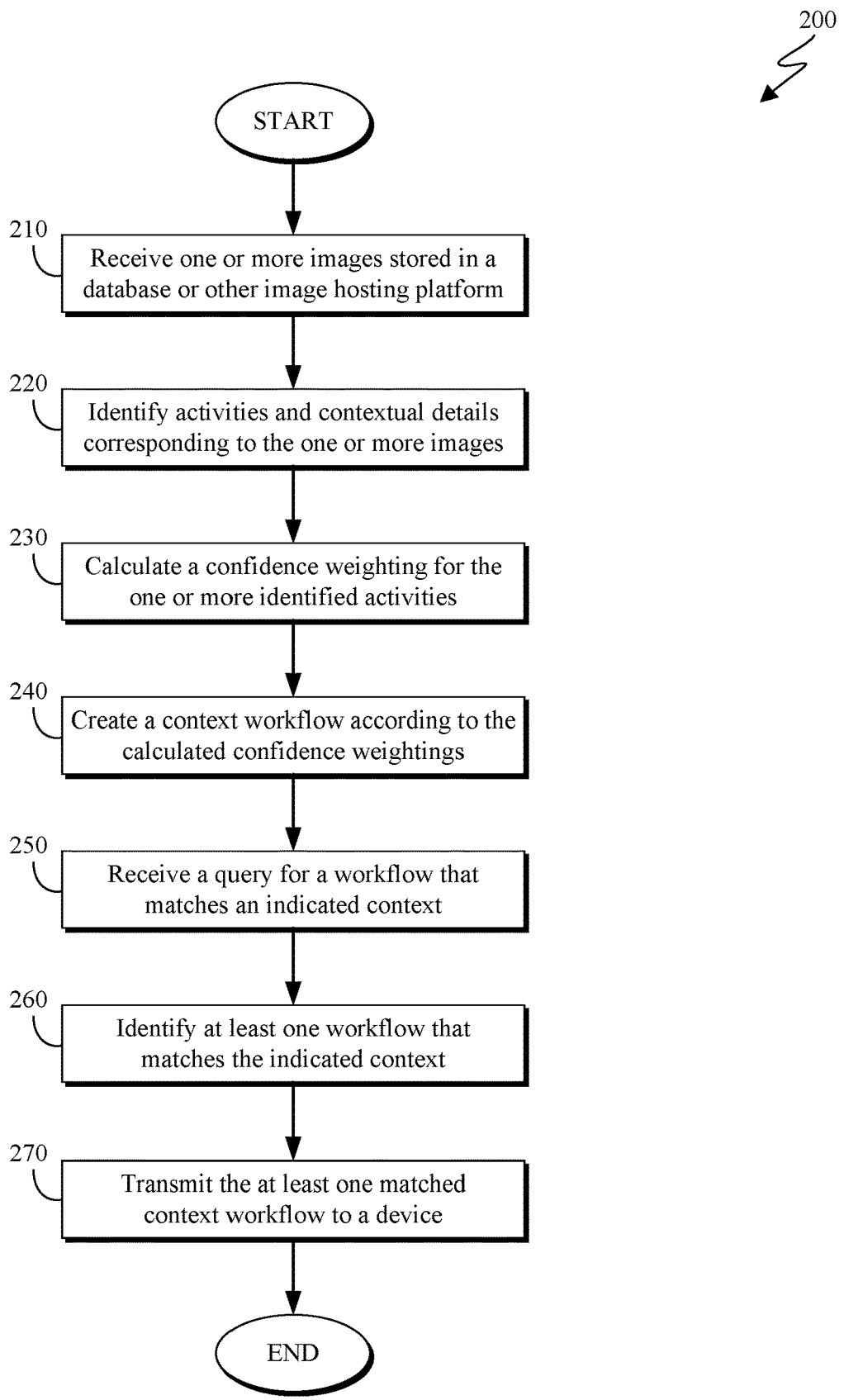
FIG. 2 is a flowchart depicting a workflow creation method in accordance with at least one embodiment of the present invention.

FIG. 2 is a flowchart depicting a workflow creation method 200 in accordance with at least one embodiment of the present invention. As depicted, workflow creation method 200 includes identifying (210) one or more stored images, identifying (220) one or more images and one or more contextual details corresponding to the one or more images, calculating (230) a confidence weighting for the one or more identified activities, creating (240) a context workflow according to the confidence weightings, receiving (250) a query for a workflow corresponding to an indicated context, identifying (260) one or more workflows that matches the indicated context, and transmitting (270) the at least one matched context workflow. Workflow creation method 200 enables the creation and identification of appropriate workflows according to one or more contextual details.

Identifying (210) one or more images of interest may include receiving one or more images from a user device. In some embodiments, the user device provides one or more stored images from its own local storage. In other embodiments, the user device provides the one or more stored images by providing location details for the one or more stored images corresponding to an image hosting platform, photo sharing service, social network platform, or other platform on which photos are stored or shared. The one or more stored images may correspond to photos or video content from which still images can be extracted. Identifying (210) one or more stored images may further include receiving a set of images as well as an indicator indicating one or more stored images of interest. The indicator may indicate specific images to be analyzed, or may indicate image formats or other image details used to identify the one or more stored images of interest. For example, the indicator may indicate that only JPEG files at a particular storage location are to be analyzed.

Detecting (220) one or more contextual details corresponding to the one or more images may include analyzing each of the one or more images to identify one or more contextual details corresponding to each image. In some embodiments, each image of the one or more images of interest may be analyzed to identify any of a time context, a location context, an object context, or an event context. A time context corresponds to the date and time at which the image was created.

An object context corresponds to one or more objects that are detected within an image. Existing object recognition techniques may be used to identify any objects that appear in an image. Utilized object recognition techniques may include, but are not limited to, appearance-based methods (such as edge matching or greyscale matching), feature based methods (such as interpretation trees or pose clustering), gradient histograms, and template matching. In at least one embodiment, an indicator provides a maximum number of objects to be analyzed or identified in each image to minimize processing time. For example, an image can contain hundreds of objects, but an indicator may indicate that only the ten most prominent objects are to be analyzed and considered to provide an object context. In such cases, the provided object context is effectively a list of the ten most prominent objects in each image.

A location context corresponds to a location at which the image was created. In some embodiments, the location context corresponds to GPS information available via a device taking a photo at the time the photo was taken. In other embodiments, the location context corresponds to a location pictured in an image. For example, consider an image taken at coordinates (X,Y) facing north that displays a barn in the image. A second image taken at the same coordinates (X,Y) facing south does not display the barn, and therefore may not be considered to be the same location as the first image because of the contents of the image. The object recognition techniques discussed previously may also be used to provide location contexts of this nature.

An event context is an event to which an image corresponds, and may be determined according to a number of factors. In at least some embodiments, an event context may be determined by analyzing the time context, the object context, and the location context, along with other available information. For example, consider a set of images taken on April $10^{th}$ between 2 PM and 6 PM. The image locations all correspond to a restaurant, and the object identification results from the image analysis reveal that the most prominently featured objects in the set of images are a birthday cake, a banner reading "Happy Birthday," a pile of gifts on a table, and a group of individuals. Processing calendar information provided by a user indicates that April $10^{th}$ is individual A's birthday. Aggregating all of this information would provide an event context for the set of images, indicating that they correspond to a birthday party for individual A. In other embodiments, an event context may be identified according to an image's source location, such as the website it is from or the title of an album the photo is in.

Calculating (230) a confidence weighting for the one or more identified activities may include determining a sequence corresponding to the images. In at least one embodiment, calculating (230) a confidence weighting includes using existing image analysis techniques identifying one or more objects, activities, or locations depicted in each of the images. A confidence weighting corresponding to the likely sequencing of the identified objects or activities is then calculated. In one embodiment, the confidence weighting is based on available timestamp information corresponding to each of the images depicting an activity or object. Because all of the images may not suggest the same sequence of activities, the confidence weightings indicate how many (or what percentage) of the images suggest or indicate a particular sequence for the activities.

The confidence weighting for an activity may additionally be based on how frequently said activity appears in an image cluster. In such embodiments, a lower selected threshold "X" (wherein X is a percentage or a ratio) may be implemented to define that any activities that appear less frequently than the selected threshold "X" are to be excluded from a created workflow. Additionally, a selected optional threshold range may be implemented to define that any activity for which a corresponding appearance frequency falls within the selected optional threshold range will be included as an optional step in a created workflow. Consider an example where a set of images includes seven image clusters related to attending a theme park, and where a selected lower threshold is 0.5, and a selected optional threshold range is (0.5, 0.6]. Six of the clusters include images of people standing in a ticket queue, five of the clusters include images of people entering a gate, all seven clusters include images of people on a ride, four of the clusters include images of groups of people posing, and one of the clusters includes an image of a bird sitting on a tree branch. In such an example, the confidence weighting may be calculated according to what percentage of the clusters include an image of each activity. Based on these weightings, it may be determined that taking a group photo is an optional step since just over half of the image clusters include such an image, and the image of the bird (and an identified corresponding activity such as "birdwatching") may be disregarded when creating a workflow because its confidence weighting is below the selected threshold.

Creating (240) a context workflow according to the confidence weightings may include analyzing the calculated confidence weightings for the one or more identified activities. The context workflow may be created according to the most likely sequence of activities as indicated by the calculated confidence weightings. In one embodiment, creating the workflows further includes saving the created workflow as a workflow file. In such an embodiment, the workflow file may be stored in a workflow database. The workflow file may contain the workflow itself, as well as one or more data fields indicating contextual details corresponding to the created workflow. For example, the data fields may indicate that the workflow corresponds to locations X and Y and event Z. These data fields enable simplified query execution by enabling the contextual details of each workflow to be quickly identified in response to a query.

Receiving (250) a query for a workflow corresponding to an indicated context may include receiving a user-initiated query for a workflow corresponding to a set of indicated contextual details. The received query may include details corresponding to any number of available contexts. For example, the query may request workflows that include a specific location, or may request workflows that include a specific location, a specific time, and a specific event context. Additionally, the received query may indicate further limitation requirements for the workflows. For example, a query may request a workflow that begins or ends at a specific location. In other words, the query may impose sequence limitations on the workflows in addition to contextual limitations. In at least one embodiment, the received query corresponds to a device's active contextual details. In other words, the query is executed to identify workflows corresponding to the device's current conditions, such as its current location and the current time.

Identifying (260) one or more workflows that matches the indicated context may include searching one or more workflow files to identify one or more workflows that match the limitations imposed by the query. In one embodiment, identifying (260) one or more workflows that matches the indicated context includes analyzing the context data fields of one or more workflow files to identify any files that contain a workflow corresponding to the indicated context. For example, if a query for workflows corresponding to location X is executed, application 112 may analyze each workflow file to determine whether said workflow file's context data fields indicate that the workflow corresponds to location X at any point.

Transmitting (270) the at least one matched context workflow may include providing the identified one or more workflows to a device from which the query was received. In one embodiment, only workflows that match all contexts indicated by the received query are transmitted. In other embodiments, workflows that match all contexts are transmitted when available, but workflows that match the most indicated contexts may be provided in the absence of a workflow that meets all the requirements.

Figures 3A, 3B:
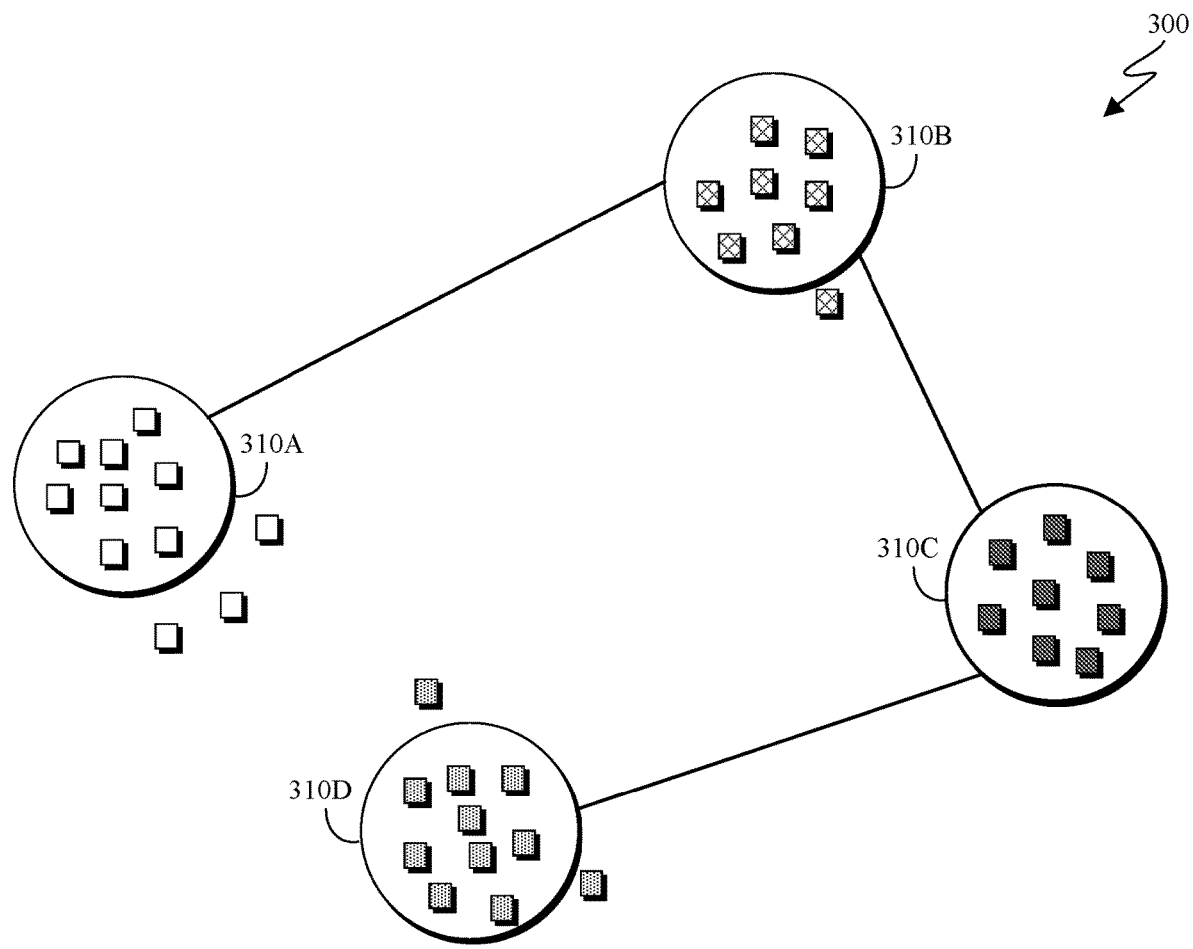
FIG. 3A depicts an example set of images in accordance with one embodiment of the present invention
FIG. 3B depicts an example table indicating the contextual details to which each cluster of images from FIG. 3A corresponds.

FIG. 3A depicts an example set of images 300 in accordance with one embodiment of the present invention. As depicted, the set of images 300 is divided into four image clusters 310, wherein each cluster comprises a plurality of images (depicted by shaded squares, wherein the shading indicates which cluster each image belongs to). The images are positioned according to the location on which the image is focused. The clusters are then created according to shared locations of focus in the images. As depicted, some of the images are not included in a cluster, as these images are not directed towards one of the locations corresponding to the four clusters.

FIG. 3B depicts an example table 320 indicating the contextual details to which each cluster of images 310 from FIG. 3A corresponds. As depicted, cluster 310A corresponds to images directed towards location A, taken at 18:00, and the images include people removing their shoes. Cluster 310B corresponds to location B, taken at 18:15, and the images include people standing in a queue. Cluster 310C corresponds to location C, taken at 18:30, and the images include people washing their feet under a water tap. Cluster 310D corresponds to location D, taken at 18:40, and the images include people eating a meal at a group of tables. In this example, the time indicated in the table corresponds to an average capture time for all of the images in the cluster. This average capture time is used to indicate a sequence in which the events indicated by the images typically occur. In another embodiment, the range of existing capture times may be used to determine sequencing as opposed to the average capture time.

Figure 4:
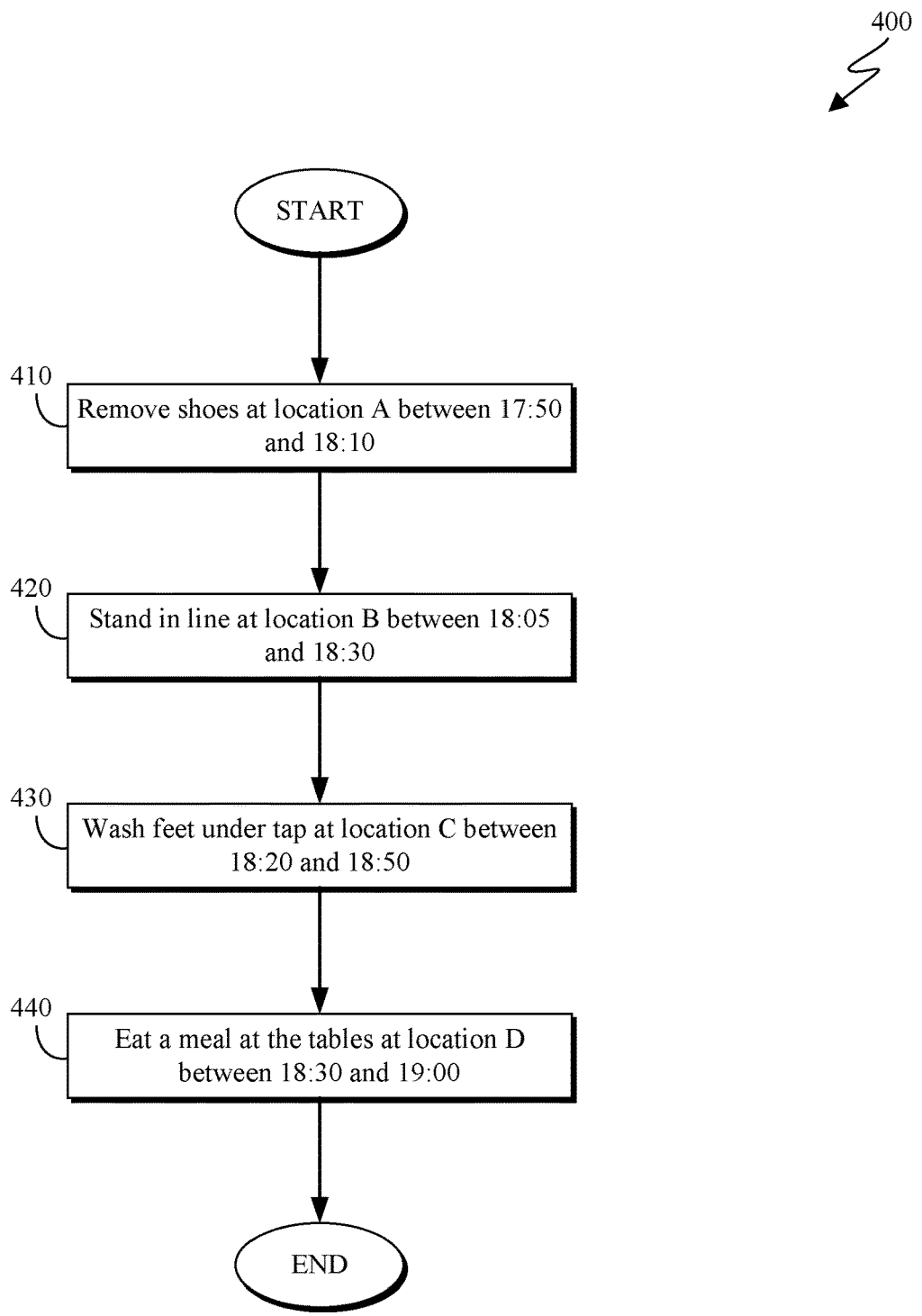
FIG. 4 depicts an example created workflow in accordance with one embodiment of the present invention.

FIG. 4 depicts an example created workflow 400 in accordance with one embodiment of the present invention. Workflow 400 corresponds to the set of images depicted and discussed with respect to FIG. 3A and FIG. 3B. As depicted, workflow 400 includes removing (410) shoes at location A between 17:50 and 18:10, standing (420) in line at location B between 18:05 and 18:30, washing (430) feet under a tap at location C between 18:20 and 18:50, and eating (440) a meal at a group of tables at location D between 18:30 and 19:00. In this embodiment, the timestamp guidelines are created according to the range of times in which images corresponding to each activity were captured.

Figure 5:
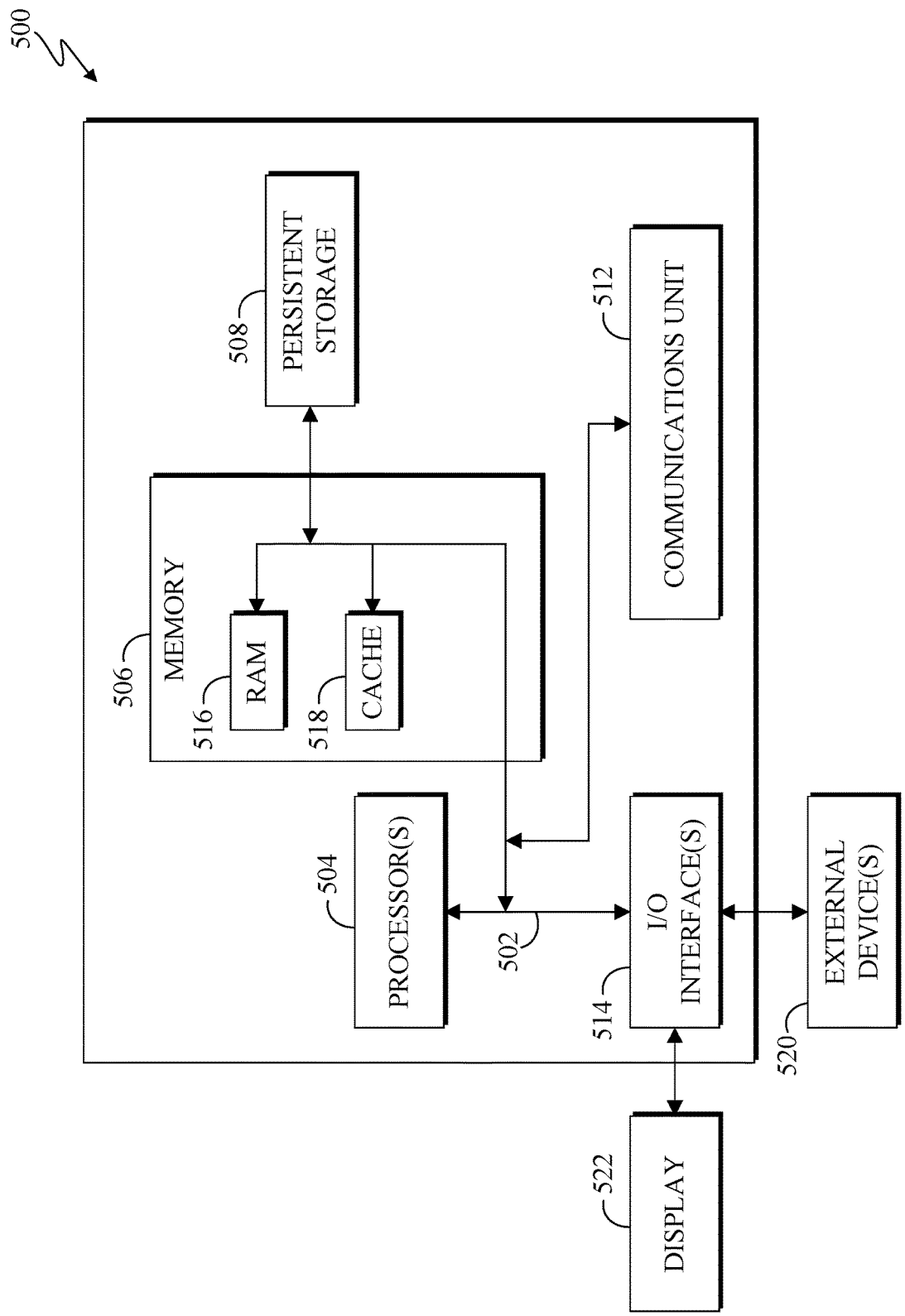
FIG. 5 depicts a block diagram of components of a computer, in accordance with some embodiments of the present invention.

FIG. 5 depicts a block diagram of components of computer 500 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

As depicted, the computer 500 includes communications fabric 502, which provides communications between computer processor(s) 504, memory 506, persistent storage 508, communications unit 512, and input/output (I/O) interface(s) 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media.

One or more programs may be stored in persistent storage 508 for access and/or execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 514 allows for input and output of data with other devices that may be connected to computer 500. For example, I/O interface 514 may provide a connection to external devices 520 such as a keyboard, keypad, a touch screen, and/or some other suitable input device. External devices 520 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 508 via I/O interface(s) 514. I/O interface(s) 514 also connect to a display 522.

Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for generating a contextual workflow, the computer program product comprising:
   one or more computer readable storage media and program instructions stored on the one or more computer readable storage media, the program instructions comprising:
   program instructions to receive a plurality of image clusters, wherein each cluster comprises one or more images;
   program instructions to analyze the received plurality of image clusters to identify one or more activities corresponding to the plurality of image clusters, wherein each of the one or more identified activities is depicted by at least one image in the plurality of image clusters, and one or more contextual details corresponding to the plurality of image clusters, wherein the one or more contextual details indicate a capture location, a capture time, a capture sequence, or a capture subject for the plurality of image clusters;
   program instructions to calculate a confidence weighting for each of the one or more identified activities for the plurality of image clusters, wherein the confidence weighting for a given identified activity indicates a percentage of the image clusters include an image depicting the given identified activity;
   program instructions to identify one or more optional activities, wherein the one or more optional activities correspond to the one or more identified activities for which the calculated confidence weightings fall within a selected optional threshold range;
   program instructions to create a contextual workflow according to the calculated confidence weightings and the one or more contextual details that comprise the one or more identified activities that have a confidence weighting greater than a selected threshold as well as an indication of the identified one or more optional activities;
   program instructions to create an indicator for the created contextual workflow that indicates one or more contexts to which the created contextual workflow corresponds;
   program instructions to store the created contextual workflow in a contextual workflow database;
   program instructions to receive a query from a device for a workflow corresponding to the indicated one or more contexts;
   program instructions to identify one or more matching contextual workflows within the contextual workflow database that match the one or more indicated contexts by searching for a workflow in the contextual workflow database that has an indicator that includes the one or more indicated contexts; and
   program instructions to transmit the one or more identified matching contextual workflows to the device.

* * * * *